UNITED STATES PATENT OFFICE.

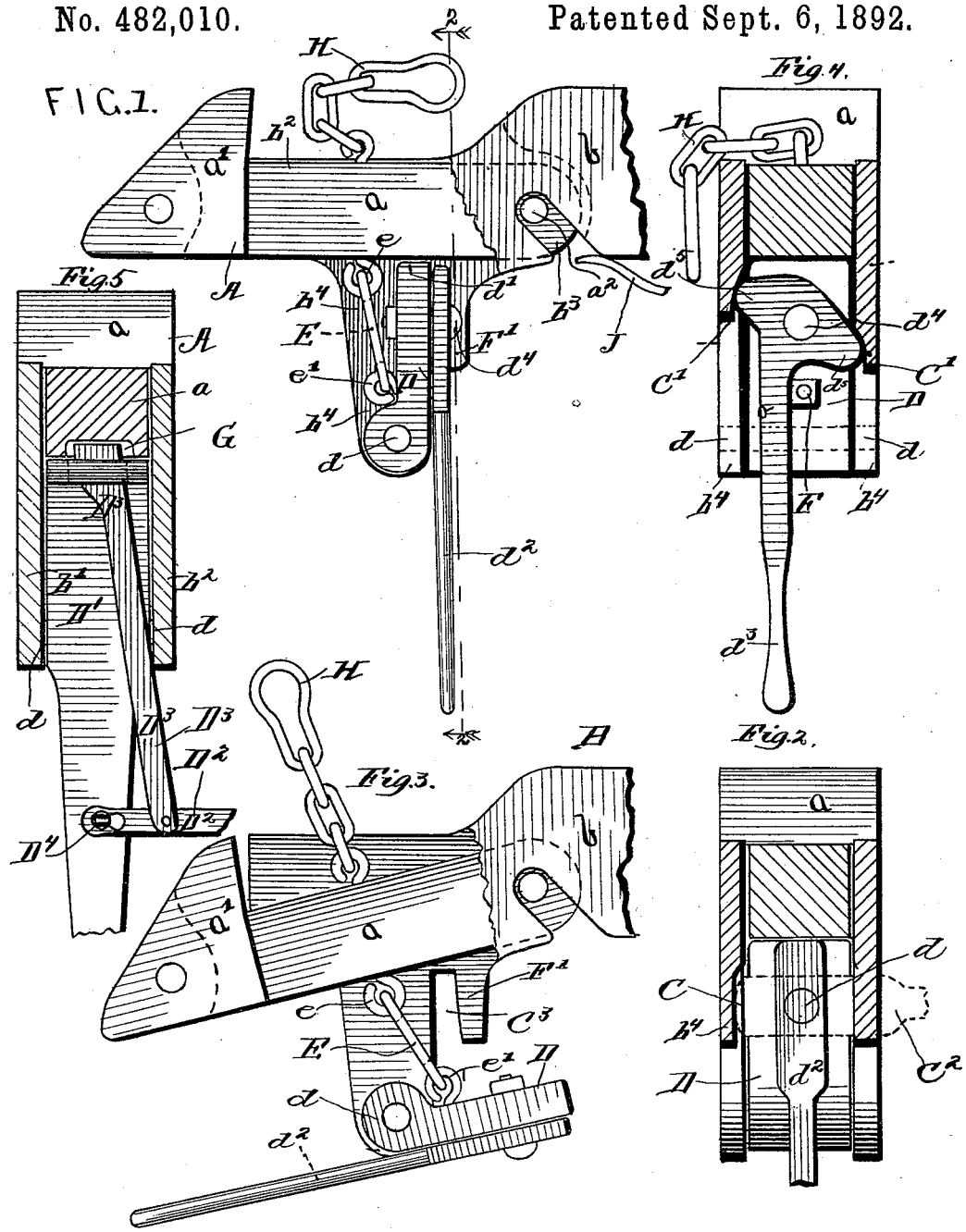

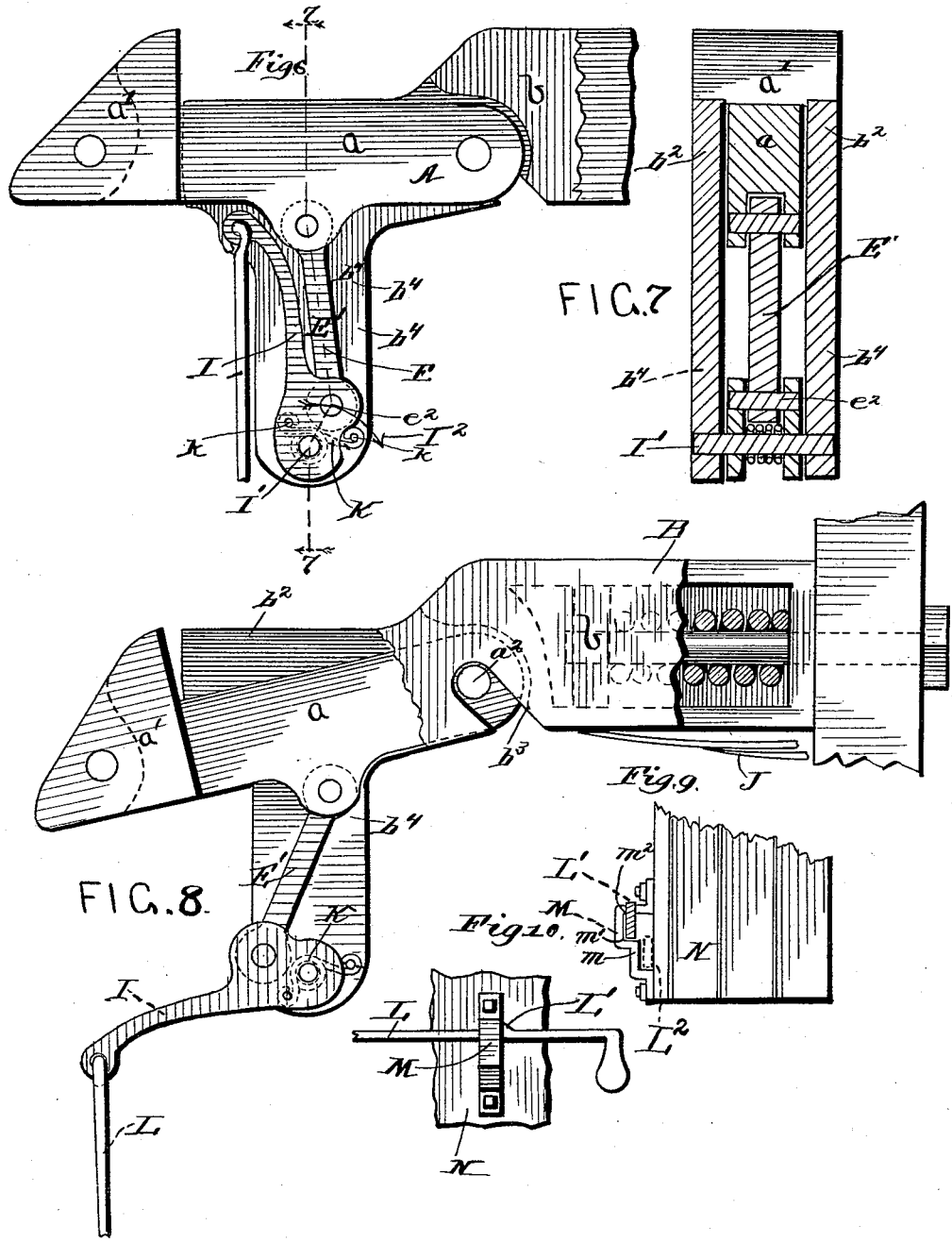

ROBERT SAMUEL KIRKPATRICK, OF DES MOINES, IOWA, ASSIGNOR OF TWO-THIRDS TO A. P. CHAMBERLIN AND E. CHAVANNES, OF SAME PLACE.

CAR-COUPLING.

SPECIFICATION forming part of Letters Patent No. 482,010, dated September 6, 1892.

Application filed September 24, 1891. Serial No. 406,635. (No model.)

*To all whom it may concern:*

Be it known that I, ROBERT SAMUEL KIRKPATRICK, residing at Des Moines, in the county of Polk and State of Iowa, have invented certain new and useful Improvements in Car-Couplers, of which the following is a description.

My invention relates to that class of couplings known in the art as the "Miller" car-coupler.

The object of my invention is to obtain a hook-coupler whereby cars can be automatically coupled by the bringing of them together in substantially the same manner as cars having the Miller coupler thereon are now automatically coupled, a car-coupler of the kind named wherein the cars can be easily and readily uncoupled by a person standing upon the ground to the side of the car, and a coupler which after having been uncoupled by a person standing upon the ground to one side of the car can be so arranged as that when another car having the Miller car-coupler thereon or a like coupler arranged in like manner is brought in contact therewith a coupling will be automatically had between the two cars.

The manner in which I accomplish the result sought by me may be briefly stated to be by pivoting a hook like the Miller hook, except in the length of the stem thereof, in a frame, such frame, in combination with the hook pivoted therein, when the hook is secured in a coupling position in the frame constituting substantially a Miller hook and stem as the same has heretofore been constructed; in securing such frame in a car-body in substantially the same manner as the Miller car-coupler is or may be secured in car-bodies—that is, so that a slight pivotal or swinging movement in relation to the car-body is possible in the coupler obtained by the combined hook and frame therefor; in pivoting a lever in such frame so that the pivoted hook can thereby be rigidly secured or locked in position in the frame so that the hook and frame shall substantially form a Miller coupling-hook and stem, and, further, in connecting the pivoted hook to such or a second lever by a link or other connecting device so that when the lever is unlocked from the pivoted hook the movement of the lever producing such unlocking will also turn said hook on the pivot thereof, so that the hook or outer end will move laterally out of a position engaging with or adapted to engage with the hook of a Miller coupler on an adjacent car.

I have illustrated my invention by the drawings accompanying and forming a part hereof, in which—

Figure 1 is a plan view of the car-coupler hook and the frame in which it is contained with a portion of the frame removed; Fig. 2, a cross-sectional view on line 2 2 of Fig. 1, viewed in the direction of the arrows; Fig. 3, a plan view of the coupler illustrated in Fig. 1, the hook thereof being open in the frame; Fig. 4, a cross-section of a modification of the hook illustrated in Fig. 1 on line 2 2 of Fig. 1, the modification consisting of a slight variation in the locking-bar; Fig. 5, a like cross-section of a further modification of the hook illustrated in Fig. 1 and on the same line 2 2, the modification consisting of a change in the locking device thereof; Fig. 6, a plan view of a modification of the device illustrated in Fig. 1, with the hook in position to automatically lock with a Miller coupler or a like hook in a like position in a second and adjacent car when brought against it; Fig. 7, a cross-section on line 7 7 of Fig. 6; Fig. 8, the modification illustrated in plan view of Fig. 6, with the hook thereof in position not to engage or couple with a like hook in a second car when brought against it; Fig. 9, a side elevation of one end of a car, showing a lever forming a part of the coupler in cross-section; and Fig. 10, an end elevation of a portion of a car, showing the lever illustrated in cross-section in Fig. 9 in elevation.

Similar letters of reference are used to indicate a given part where more than one view thereof is shown in the several figures.

A is a hook consisting of the stem $a$, the hook end or head $a'$, and the pivot $a^2$. Pivot $a^2$ may be cast integral with the hook A, or it may consist of a bolt driven into or through the stem $a$.

B is the frame in which the hook A is pivoted. The frame B consists of end $b$, into which a suitable bolt and spring are or may be placed to secure the coupler in the car, as illustrated in Fig. 8 of the drawings, the sides $b'$ $b^2$, between which the stem $a$ of the hook A is placed, and the projection $b^4$, in which is pivoted a lever connected by a link with the hook A.

$b^3$ is a slot adapted to receive the pin or projection $a^2$ of hook A.

C in Fig. 2 and C' in Fig. 4 are recesses in part $b^4$ of frame B.

D is a lever or arm pivoted in frame B by bolt $d$, such lever being of sufficient length so that when in position (illustrated in Figs. 1, 2, 4, and 5) the end $d'$ thereof will abut against the stem $a$ of the hook A, thereby holding the hook rigidly in position in frame B, so that, together with such hook, it shall substantially constitute a Miller hook and stem.

$d^2$ in Figs. 1, 2, and 3 and $d^3$ in Fig. 4 are respectively handles by which the lever D can be turned. These handles $d^2$ $d^3$ are also adapted to lock lever D in the position in which it is illustrated in Fig. 1.

In order to thus lock the lever D, the arms $d^2$ $d^3$ are respectively mounted on pivotal bolt $d^4$ to the lever D, and recess C in Figs. 2 and 3 and C' in Fig. 4, respectively, are cut in the frame B, so that when such arms $d^2$ $d^3$ are respectively turned on the bolt $d^4$ into the position illustrated in Fig. 4 by full lines and indicated in Fig. 2 by dotted lines lettered $C^2$ the end in Figs. 1, 2, and 3 or projections in Fig. 4 on the levers $d^2$ $d^3$ will enter into such recesses C C', respectively, and at the same time such arms are in recess $C^3$.

E is a link one end of which is attached to the hook A and the other end to the lever D. I prefer to use the eyebolts $e$ $e'$, respectively, for attaching this link E to the hook A and to the lever D. The manner in which the end $a'$ of the hook A is drawn laterally to one side by the turning of the lever D is readily ascertained by inspection of the drawings Figs. 1 and 3.

In the modification illustrated in Fig. 5 the arm $d^3$ has projections $d^5$ thereon, adapted to enter into the recesses C' C'. Projections $d^5$ $d^5$ are on the side of the arm $d^3$, and such lever is in a horizontal position, resting on projection F when locked, and to unlock it the end of the arm $d^3$ is raised from the horizontal position, after which it is used as a handle for moving the lever.

In the modification illustrated in Fig. 5 the lever D of Fig. 1 is lettered D' and is extended beyond the pivot $d$, so that the small end thereof can be used as a handle for turning it, and such lever D' is locked in position against the hook A by the dropping of the pivotal handle $D^2$ to a vertical position, as illustrated in Fig. 5, the bolt $D^3$ being thereby forced forward and into the recess G in part $a$ of hook A. To unlock the lever D', the arm $D^2$ is turned on pivot $D^4$ and raised to a horizontal position, and then such arm $D^2$, together with the lever D', is turned so that the hook A is unlocked and drawn laterally to one side.

H is a safety-chain by which one car may be attached to an adjacent car when the coupler is otherwise out of order, or to be used as an additional coupler or safety-coupler when desired.

J is a spring tending to hold the frame B in position, so that when the coupler-hook A is in the position illustrated in Figs. 1 and 6 such hook will automatically engage with the coupler of an adjacent car.

Figs. 6, 7, 8, 9, and 10 illustrate a modification of my invention in which the lever I is employed in place of the lever D of the hereinbefore-described construction. In this modification the link E' is used, so far as it constitutes the means for drawing the end $a'$ of the hook A to one side, as a substitute for the link E; but the locking of the hook A in a closed position is effected in this modification by the carrying of the pivotal point $e^2$, connecting the link E' with the lever I, beyond the pivotal point I', on which the lever I is pivoted.

By inspection of the drawings Fig. 6 it will be readily observed that with the hook A, link E', pin $e^2$, and pin I' in the position there illustrated any tendency of the hook end $a$ of the hook A to move toward the position in which it is illustrated in Fig. 8 will tend to force the pin $e^2$ around the pin I' in the direction indicated by the arrow $I^2$, passing through the pin $e^2$, and that any movement of the pin $e^2$ in such direction around the pin I' will force the free end of lever I against the hook A or against the link E', and such hook A will be thereby locked in position to couple.

K is a spring one end of which presses against an abutment, as $k$, in the frame B and the other end against an abutment, as $k'$, in lever I, yieldingly holding the lever I in the position illustrated in Figs. 6 and 7.

L is a lever having thereon notch L', secured at one end to arm I.

M is a catch on the end of the car N, such catch consisting of a metal strap having therein the bends $m$ $m'$ $m^2$.

The purpose of the projection L' and the catch M is to obtain a construction whereby when the lever L is in the position illustrated in Fig. 8 the projection L' thereon can be locked against the catch M, as illustrated in Figs. 9 and 10. The locking of this arm or lever L holds the hook A open or in an uncoupled position, as illustrated in Fig. 8, against the tendency of the spring K to close the same, when, as by a second car coming forcibly against the car whereon the coupler is secured and locked in open position, (illustrated in Fig. 8,) a shock is sustained, and such shock will tend to jar the lever L out of the locked position in which it is illustrated in Figs. 9 and 10 into position so that it may fall into the position illustrated in cross-section by the dotted lines lettered L² in Fig. 9, thus unlocking the lever I, thereby permitting it to assume the position in which it is illustrated in Fig. 6, in which position hook A is adapted to couple with a suitable coupler on an adjacent car.

Having thus described my invention, what I claim, and desire to secure by Letters Patent, is—

1. In a car-coupler, the combination of a frame adapted to be secured in a car, a hook pivoted by the stem thereof in the frame, so that the hook extends beyond the edge of the frame on the hook side thereof and can be moved laterally therein and thereby retracted from such extension, a lever pivoted in the frame to one side of and between the pivotal point of such hook-stem and the hook end thereof, and a link connecting the stem of the hook with the lever, whereby when the hook is in position in the frame to automatically couple with a suitable coupler on an adjacent car it is locked in such position by the lever and when the lever is turned so that the hook is unlocked such hook is moved laterally to one side and into a position not adapted to engage with the coupler on an adjacent car, substantially as described.

2. In a car-coupler, the combination of a frame adapted to be secured in a car, a spring abutting against the car and against the frame, a hook pivoted by the stem thereof in the edge of the frame on the hook side thereof, so that the hook extends beyond the frame and can be moved laterally therein and thereby retracted from such extension, a lever pivoted in the frame to one side of and between the pivotal point of such hook-stem and the hook end thereof and a link connecting the stem of the hook with the lever, and an arm movably secured on the lever, adapted to lock such lever in a determined position, whereby when the hook is in position in the frame to automatically couple with a suitable coupler on an adjacent car it is locked in such position and the lever so locking it in position can be locked in a determined position by the movable arm thereon and when the lever is turned so that the hook is unlocked such hook is moved laterally one side and into a position not adapted to engage with the coupler on an adjacent car, substantially as described.

ROBERT SAMUEL KIRKPATRICK.

Witnesses:
KATIE HARGADEN,
F. L. BROWN.